United States Patent [19]

Aihara

[11] Patent Number: 5,116,168

[45] Date of Patent: May 26, 1992

[54] METHOD AND APPARATUS FOR CONTROLLING DRILLING OPERATION

[75] Inventor: Yukitaka Aihara, Tokyo, Japan

[73] Assignee: Fuji Jukogyo Kabushiki Kaisha, Tokyo, Japan

[21] Appl. No.: 344,631

[22] Filed: Apr. 28, 1989

[30] Foreign Application Priority Data

Apr. 28, 1988 [JP] Japan .................. 63-107269

[51] Int. Cl.$^5$ .................. B23B 35/00; B23B 39/00
[52] U.S. Cl. .................. 408/1 R; 408/9; 408/10
[58] Field of Search .................. 408/8–10, 408/11; 175/27, 24, 40; 364/474.15, 474.16

[56] References Cited

U.S. PATENT DOCUMENTS

| | | | |
|---|---|---|---|
| 4,157,231 | 6/1979 | Phillips | 408/9 X |
| 4,198,180 | 4/1980 | Schultz | 408/10 X |
| 4,346,444 | 8/1982 | Schneider et al. | 364/474.16 |
| 4,688,970 | 8/1987 | Eckman | 408/10 X |
| 4,697,964 | 10/1987 | Daiko et al. | 408/11 |
| 4,787,049 | 11/1988 | Hirata et al. | 364/474.15 |
| 4,854,786 | 8/1989 | Alexander et al. | 408/9 X |
| 5,022,798 | 6/1991 | Eckman | 408/9 |

FOREIGN PATENT DOCUMENTS

| | | | |
|---|---|---|---|
| 55879 | 5/1979 | Japan | 408/11 |
| 274843 | 12/1986 | Japan . | |
| 15060 | 1/1987 | Japan . | |

*Primary Examiner*—Larry I. Schwartz
*Assistant Examiner*—R. Schultz
*Attorney, Agent, or Firm*—Beveridge, DeGrandi & Weilacher

[57] ABSTRACT

In drilling control method and apparatus for making holes through a composite workpiece made of a plurality of materials having different machining properties, the workpiece is first drilled at a feed speed and a rotational speed of a drill which are selected. When the drilling of the workpiece is initiated, the amounts of the feeding speed and the rotational speed are detected by a feed speed sensor and a rotational speed sensor, respectively, and thrust force applied to the drill during the drilling is also detected by a thrust sensor. The detected feed speed and the rotational speed of the drill are compared in a comparison unit with optimum values which are adapted to the detected thrust force. When the detected values of the feed speed and the rotational speed of the drill coincide substantially with the optimum values, the drilling operation is performed, while when the detected values of the speed do not coincide with the optimum values, the feed speed and rotational speed of the drill are changed to the optimum values.

6 Claims, 2 Drawing Sheets

METHOD AND APPARATUS FOR CONTROLLING DRILLING OPERATION

BACKGROUND OF THE INVENTION

The present invention relates to a drill control method and apparatus, and, more particularly, to a method and apparatus for controlling drilling operations when holes are drilled through a composite workpiece which is made up of a plurality of materials of different machining properties.

Ordinarily, holes are drilled by rotating and feeding a drill at a constant speed. However, in the case where holes are drilled through a composite workpiece made of a plurality of laminated materials of different machining properties, a drilling condition suitable for one of the materials may not be suitable for another material, and boundary-layer peeling or chipping phenomena tend to occur thereby resulting in deterioration of the quality of the drilled holes. In addition, the usable life of the drill tends to be short, and selection of the drilling conditions is extremely difficult.

In order to eliminate the difficulties described above, there has been developed a drilling control method wherein drilling conditions, such as the feed speed and the rotational speed are set beforehand, which are suitable for each material; each material is drilled constantly under the set conditions; the terminating point of drilling of the material is detected from the time required or from an amount of the speed of the drill; the drilling condition is then changed to another one suitable for the material of the next layer and the drilling operation is carried out continuously by changing the drilling conditions one after the other as described above.

For controlling the rotational speed of the drill, there has been proposed a method for controlling the spindle speed for the drill (for instance, refer to Japanese Patent Laid-Open (KOKAI) No. 274843/1986). In this method, a variable speed motor is used for driving the spindle, and this motor is controlled based on a difference between a command speed and an actual speed.

For monitoring the cutting conditions, there has been proposed a device for controlling the machining condition (Japanese Patent Laid-Open (KOKAI) No. 15060/1987). In this device, a load cell is interposed between a chuck and a mounting surface therefor. The load cell detects the thrust force applied to the drill and delivers a voltage corresponding to the thrust. When the voltage exceeds a predetermined value, the terminating point of the drilling operation is detected without requiring any other positioning.

However, even if the drill feeding speed is controlled according to the method disclosed in Japanese Patent Laid-Open (KOKAI) No. 274843/1986, and the completion of the drilling of one material is determined by the device disclosed in Patent Laid-Open 15060/1987, the process becomes too complicated because multiple drilling conditions equal to that of the number of materials must be set beforehand. Furthermore, the feed speed and the rotational speed of the drill must be varied in accordance with the thickness of each material.

In addition, the drilling condition even for the same material must be varied according to the thrust force applied to the drill for preventing the boundary layer from peeling and for improving the quality of the drill hole. Optimum control of the drill is difficult under such conditions. The known method does not provide such operations.

SUMMARY OF THE INVENTION

An object of the present invention is to provide a method and an apparatus for controlling drilling operations, wherein the difficulties of the conventional method are eliminated without using complicated processes.

Another object of the invention is to provide a method and an apparatus for controlling drilling operations wherein the setting of drilling conditions for a workpiece made of composite materials is not required, and each material of the workpiece is drilled depending on the thrust force detected through the operation of drilling the material.

These and other objects of the present invention are achieved by a method of controlling drilling operations, comprising the steps of initiating the drilling operation for a material at a feed speed and a rotational speed of a drill; detecting the feed speed and the rotational speed of the drill and thrust force applied to the drill; and controlling the feed speed and the rotational speed of the drill based on the detected thrust force so as to maintain an optimum drilling condition.

According to the present invention, there is also provided an apparatus comprising: a feed sensor for detecting the feed speed of a drill; a speed sensor for detecting the rotational speed of the drill; a thrust sensor for detecting thrust force applied to the drill while the material is drilled; comparison means for comparing outputs of said sensors with optimum values; correction means for correcting the feeding speed and the rotational speed according to the results of the comparison; and a control circuit for controlling the feed speed and the rotational speed of the drill according to the output from the correction means.

A preferred embodiment of the present invention will become understood from the following detailed description referring to the accompanying drawings.

DESCRIPTION OF THE PREFERRED EMBODIMENT

Figure 1:
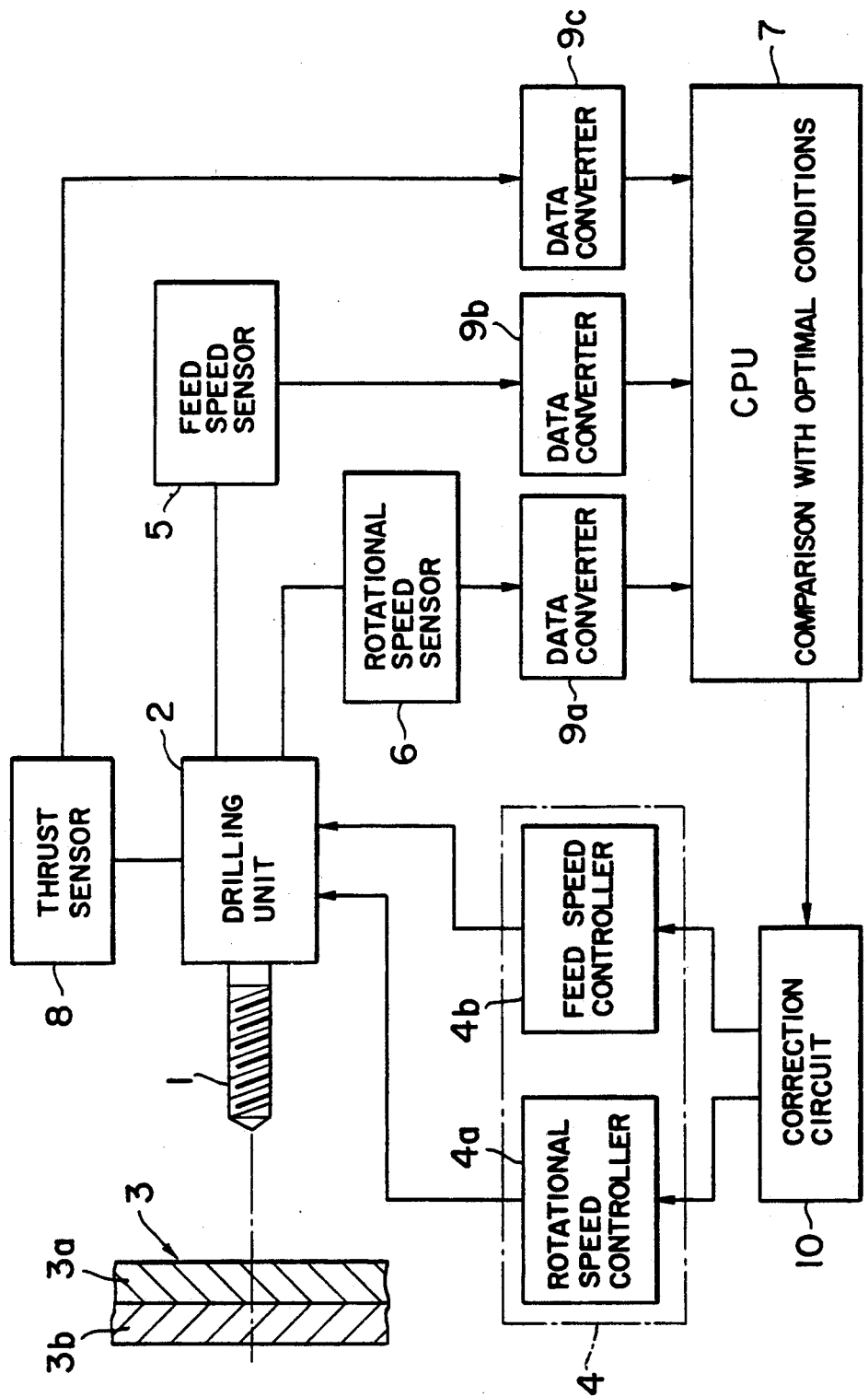
FIG. 1 is a block diagram showing an apparatus for controlling drilling operations according to the present invention.

Referring to the block diagram of FIG. 1 showing the general arrangement of the apparatus for controlling drilling operations of the present invention, a drill 1 is fixedly mounted on a drilling unit 2. The drill 1 is rotated by the drilling unit 2 and is shiftable toward and away from a workpiece 3, which is a composite workpiece made of a plurality of materials 3a and 3b having different machining properties.

A control device 4 is connected to the drill unit 2 for controlling the rotational speed and the feed speed of the drill 1. The control device 4 comprises a rotational speed controller 4a and a feed speed controller 4b. A feed speed sensor 5 and a rotational speed sensor 6 are connected to the drill unit 2 for detecting the feed speed and the rotational speed of the drill 1, respectively.

Furthermore, a thrust sensor 8 such as a load cell is coupled to the drill unit 2 for detecting axial thrust force applied to the drill 1 when the drill 1 is forced into the workpiece 3. Outputs of the feed speed sensor 5, the rotational speed sensor 6 and the thrust sensor 8 are supplied to a CPU 7 via data converters 9a, 9b, and 9c, such as A-D converters, respectively. In the CPU 7, there is stored or placed in memory beforehand optimum relationships of the values for the thrust force, the feed speed and the rotational speed of the drill 1 for respective materials of the workpiece. The CPU 7 functions to compare the output data obtained from the sensors 5 and 6 with the optimum relationship for the thrust force, the feed speed, and the rotational speed of the drill 1, and delivers an output to the correction circuit 10. The correction circuit 10 corrects the feed speed and the rotational speed depending on the output of the CPU 7, and delivers control signals to the rotational speed controller 4a and the feed speed controller 4b of the control device 4. The control device 4 controls the rotational speed and the feed speed of the drill 1 depending on the control signals.

Figure 2:
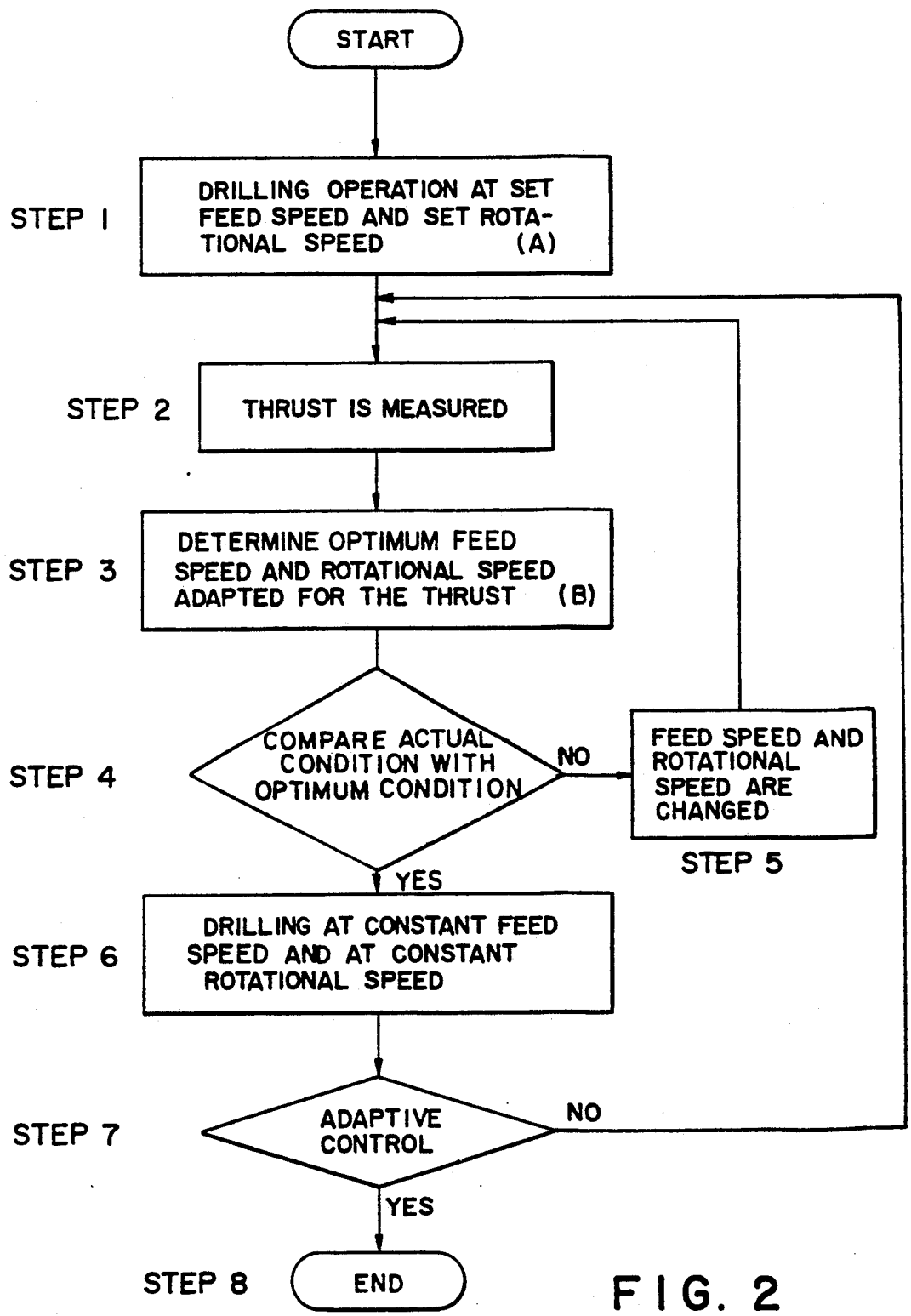
FIG. 2 is a flow chart showing the steps of the method for controlling drilling operations according to the present invention.

FIG. 2 is a flow chart illustrating the method for controlling the drilling operation according to the present invention.

At the start of the control, the thrust force applied to the drill 1 is set at zero before drilling. In step 1, the rotational speed and the feed speed are set for the first material of the workpiece. In step 2, the thrust force applied to the drill 1 due to the drilling of the first material is detected by the thrust sensor 8. In step 4, the rotational speed and the feed speed (condition (A)) of the drill 1 detected by the sensors 6 and 5 are compared with optimum rotational speed and optimum feed speed (optimum condition (B)) of the drill 1, which are determined depending on the detected thrust force in step 3. When it is determined in step 4 that the condition (A) is at least substantially equal to the optimum condition (B), the drilling operation is carried out in step 6 with the initially set speeds being maintained. However, at step 4 when it is determined that the condition (A) is not substantially equal to the condition (B), the rotational speed and the feed speed are corrected in step 5 to the optimum condition (B) at step 6 in a manner of conventional feed-back control, and the process returns to step 2 where the thrust force is detected. Then, the cycle (steps 2→3→4→5→2) repeats until condition (A) becomes close to condition (B), whether or not an adaptive control is obtained is checked at step 7, and when the result is YES, the drilling operation for the materials is terminated at step 8, whereas the process returns to step 2 when the result is NO at step 4. Thereafter, the drilling operation is carried out in the same manner for the second material of the workpiece.

Although in the method described above, the rotational speed and feed speed are set at step 1, it will be apparent that the rotational speed and the feed speed set for the previously drilled material may be used for these values.

Further, although the CPU 7 are used for storing in memory the optimum conditions and comparing the outputs of the sensors 5 and 6 with the optimum conditions set based on the output of the sensor 8, it will be understood that any other circuit adapted for accomplishing these functions may also be used instead of the CPU 7.

While the presently preferred embodiments of the present invention have been shown and described, it is to be understood that this disclosure is for the purpose of illustration and that various changes and modifications may be made without departing from the scope of the invention as set forth in the appended claims.

According to the present invention, the optimum which the best feed speed and rotational speed for respective materials are taken by detecting the thrust force generated by the drilling operation. Therefore, accuracy and quality of the drilled holes are improved and usable life of the drill is increased. As it is not required to previously set the drilling condition according to thickness of the materials, the operation is facilitated and made more rapid.

What is claimed is:

1. A method of controlling the drilling operation of a drill for a composite workpiece made of a plurality of laminated materials including at least a first material and a subsequent material, comprising:

setting a rotational speed and a feed speed of said drill to a set rotational speed and a set feed speed, respectively, for said first material;

starting said drilling operation in said first material in accordance with said set rotational speed and said set feed speed;

detecting an actual rotational speed, an actual feed speed and an actual thrust force applied to said drill during said drilling operation;

determining an optimum rotational speed and an optimum feed speed depending on said actual thrust force;

comparing said actual rotational speed and said actual feed speed with said optimum rotational speed and said optimum feed speed, respectively;

correcting said set rotational speed and said set feed speed to said optimum rotational speed and said optimum feed speed respectively when said actual rotational speed and said actual feed speed are not substantially equal to said optimum rotational speed and said optimum feed speed, respectively; and continuing said drilling operation with said rotational speed and said feed speed when said actual rotational speed and said actual feed speed are substantially equal to said optimum rotational speed and said optimum feed speed, respectively, so as to make a precise and uniform hole and to improve durability of said drill.

2. A control system for a drilling apparatus having a drill adapted for making a hole in a composite workpiece made of a plurality of laminated materials, a rotational speed sensor for detecting a rotational speed signal, a feed speed sensor for detecting a feed speed of said drill and for generating an actual feed speed signal, a thrust sensor for detecting an actual thrust force generated in said drill during a drilling operation and for producing a thrust force signal, and control means for outputting control signals to control the rotational speed and the feed speed of said drill, the improvement of said system comprising:

determining means responsive to said thrust force signal for determining an optimum rotation speed and optimum feed speed adapted for said thrust force;

comparing means for comparing said actual rotational speed and actual feed speed signals with said optimum rotational speed and optimum feed speed signals respectively and for generating a correcting signal when said actual rotational speed and actual feed speed signals are not substantially equal to said optimum rotational speed and optimum feed speed signals; and correcting means responsive to said correcting signal for changing said output signals until said actual rotational speed and said actual feed speed meet said optimum rotational speed and said optimum feed speed, respectively, thereby each material of the composite workpiece regardless the different machining property and thickness of each material while drilling and making a precise and uniform hole and to improve durability of said drill.

3. The control system according to claim 2, wherein said control means is adapted to store a plurality of optimum rotational speeds and optimum feed speeds corresponding to various thrust forces, respectively.

4. The control system according to claim 2, wherein said control means comprises a rotational speed controller and a feed speed controller.

5. A method of controlling the drilling operation of a drill for a composite workpiece made of plurality of laminated materials in response to output signals from a control unit, comprising:

detecting an actual rotational speed, an actual feed speed and an actual thrust force applied to said drill during the drilling operation;

determining an optimum rotational speed and an optimum feed speed for the drilling operation dependent on said actual thrust force;

comparing said actual rotational speed and said optimum rotational speed and comparing said actual feed speed and said optimum feed speed;

correcting said output signals until said actual rotational speed and said actual feed speed meet said optimum rotational speed and said optimum feed speed, respectively, when said actual rotational speed and said actual feed speed are not approximately close to said optimum rotational speed and said optimum feed speed; and repeating said determining, comparing and correcting steps when the thrust force is changed due to the drilling of subsequent materials, thereby automatically setting best rotational speed and feed speed for each material of the composite workpiece regardless of the different machining property and thickness of each material while drilling.

6. The method according to claim 3, further comprising:

setting an initial rotational speed and an initial feed speed of said drill for a first material to be drilled before starting the drilling operation; and starting the drilling operating in response to output signals from the control unit corresponding to said initial rotational speed and said initial feed speed, respectively, to drill said first material.

* * * * *